US00RE40364E

(19) United States
(12) Reissued Patent
Okamura et al.

(10) Patent Number: US RE40,364 E
(45) Date of Reissued Patent: Jun. 10, 2008

(54) TONE SIGNAL PROCESSING APPARATUS WITH INTERMITTENT CLOCK SUPPLY

(75) Inventors: Kazuhisa Okamura, Hamamatsu (JP); Tetsuji Ichiki, Hamamatsu (JP)

(73) Assignee: Yamaha Corporation, Hamamatsu-Shi (JP)

(21) Appl. No.: 10/805,489

(22) Filed: Mar. 19, 2004

Related U.S. Patent Documents

Reissue of:
(64) Patent No.: 6,359,206
Issued: Mar. 19, 2002
Appl. No.: 09/809,816
Filed: Mar. 16, 2001

(30) Foreign Application Priority Data

Mar. 22, 2000 (JP) ..... 2000-079462

(51) Int. Cl.
*G10H 7/00* (2006.01)

(52) U.S. Cl. ..... 84/603; 84/606; 84/609; 84/649

(58) Field of Classification Search ..... 84/600, 84/603–606, 609, 622–625, 649, 659–660
See application file for complete search history.

(56) References Cited

U.S. PATENT DOCUMENTS 4,128,032 A * 12/1978 Wada et al. ..... 84/604
4,987,600 A * 1/1991 Rossum ..... 381/118
5,532,424 A * 7/1996 Hideo ..... 84/607
6,397,321 B1 5/2002 Yamamoto et al.

FOREIGN PATENT DOCUMENTS

| | | |
|---|---|---|
| JP | 06-167969 | 6/1994 |
| JP | 08-095562 | 4/1996 |
| JP | 2000-057122 | 8/1998 |
| JP | 2000-010907 | 1/2000 |
| JP | 2000-57122 * | 2/2000 |

* cited by examiner

*Primary Examiner*—Marlon T. Fletcher
(74) *Attorney, Agent, or Firm*—Morrison & Foerster LLP

(57) ABSTRACT

A music apparatus is constructed for processing a music tone signal in response to a clock signal at each sampling period. In the music apparatus, a clock generator generates the clock signal. A signal processor is operable in synchronization to the clock signal for time-divisionally processing a plurality of music tone signals through a plurality of channels within one sampling period. A clock controller is operative during a supply duration allocated within one sampling period for supplying the clock signal to the signal processor from the clock generator to thereby operate the signal processor, and is operative during other than the supply duration within one sampling period for stopping the supplying of the clock signal to the signal processor to thereby suspend the signal processor.

15 Claims, 11 Drawing Sheets

SOUND SYSTEM
18
DAC
17
DELAY MEMORY
270
EXTERNAL CIRCUIT
260
WAVEFORM MEMORY
250
TONE GENERATOR
200
STORAGE MEDIUM
16
POWER SUPPLY BLOCK
22
SWITCH PANEL
13
DISPLAY BLOCK
14
B
CPU BUS LINE
RAM
12
ROM
11
CPU
10
CLOCK
19
PLAY CONTROLS
15
MIDI INTERFACE
20

TONE SIGNAL PROCESSING APPARATUS WITH INTERMITTENT CLOCK SUPPLY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a tone generator for use in such apparatuses for generating tones as electronic musical instruments and amusement appliances. More particularly, the present invention relates to a tone signal processing apparatus for suitable in saving the power consumption of these instruments and appliances.

2. Description of Related Art

With the recent enhancement in the performance of tone generators for use in electronic musical instruments for example, the maximum number of sounding channels and the level of operating clock frequencies grow steadily. This inevitably causes an increase in the number of transistors and the number of transistor switching operations in a unit time in tone generator LSIs for example, thereby presenting a problem of the proportionally increased power consumption in these LSIs. Especially, with battery-driven electronic musical instruments, the large power consumption presents a serious problem which must be solved to provide an operating life long enough for the general use of these musical instruments.

With CPUs for use in personal computer for example, a technology is known by which the clock frequency is adjusted in accordance with occasional processing loads. However, this technology has a drawback of complicating the configuration of the clock circuits.

SUMMARY OF THE INVENTION

It is therefore an object of the present invention to provide a tone signal processing apparatus having a relatively simple configuration but capable of reducing the power consumption in accordance with processing load.

According to the invention, an apparatus is constructed for processing a music tone signal in response to a clock signal at each sampling period. The apparatus comprises a clock generator that generates the clock signal, a signal processor operable in synchronization to the clock signal for time-divisionally processing a plurality of music tone signals through a plurality of channels within one sampling period, and a clock controller being operative during a supply duration allocated within one sampling period for supplying the clock signal to the signal processor from the clock generator to thereby operate the signal processor, and being operative during other than the supply duration within one sampling period for stopping the supplying of the clock signal to the signal processor to thereby suspend the signal processor.

Preferably, the inventive apparatus further comprises an allocating device that allocates a predetermined supply duration within one sampling period, and a specifying device that specifies a detail of processing of the music tone signals in accordance with the predetermined supply duration so that the signal processor can complete the processing of the music tone signals within the predetermined supply duration. In such a case, the allocating device allocates the predetermined supply duration based on a predetermined number of channels through which music tones are generated concurrently by the processing of the music tone signals. Otherwise, the allocating device allocates the predetermined supply duration based on a predetermined number of steps by which a program is executed stepwise for processing the music tone signals. Further, the specifying device specifies the detail of the processing of the music tone signals in terms of a number of channels through which the music tone signals are processed for concurrent generation of music tones. Otherwise, the specifying device specifies the detail of the processing of the music tone signals in terms of a kind of a program selectably executed by the signal processor in the processing of the music tone signals.

Preferably, the inventive apparatus further comprises a specifying device that specifies a detail of processing of the music tone signals, and an allocating device that allocates a supply duration within one sampling period in accordance with the specified detail of the processing so that the signal processor can complete the specified detail of the processing of the music tone signals within the allocated supply duration. In such a case, the allocating device allocates the supply duration in accordance with the specified detail of the processing in terms of a predetermined number of channels through which music tones are generated concurrently by the processing of the music tone signals. Otherwise, the allocating device allocates the supply duration in accordance with the specified detail of the processing in terms of a predetermined number of steps by which a program is executed stepwise for processing the music tone signals. Further, the specifying device specifies the detail of the processing of the music tone signals in terms of a number of channels through which the music tone signals are processed for concurrent generation of music tones. Otherwise, the specifying device specifies the detail of the processing of the music tone signals in terms of a kind of a program selectably executed by the signal processor in the processing of the music tone signals.

Preferably, the signal processor processes the music tone signal in such a manner that waveform data of a designated timbre is read out to generate the music tone signal at a designated pitch. Otherwise, the signal processor processes the music tone signal in such a manner that waveform data is read out to generate the music tone signal and the generated music tone signal is subjected to filter processing. Alternatively, the signal processor processes the music tone signal in such a manner as to control an amplitude of the music tone signal. Otherwise, the signal processor processes the music tone signal in such a manner as to impart an effect to the music tone signal.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

1. First Embodiment 1.1 Hardware Configuration 1.1.1 Overall Configuration

Figure 1:
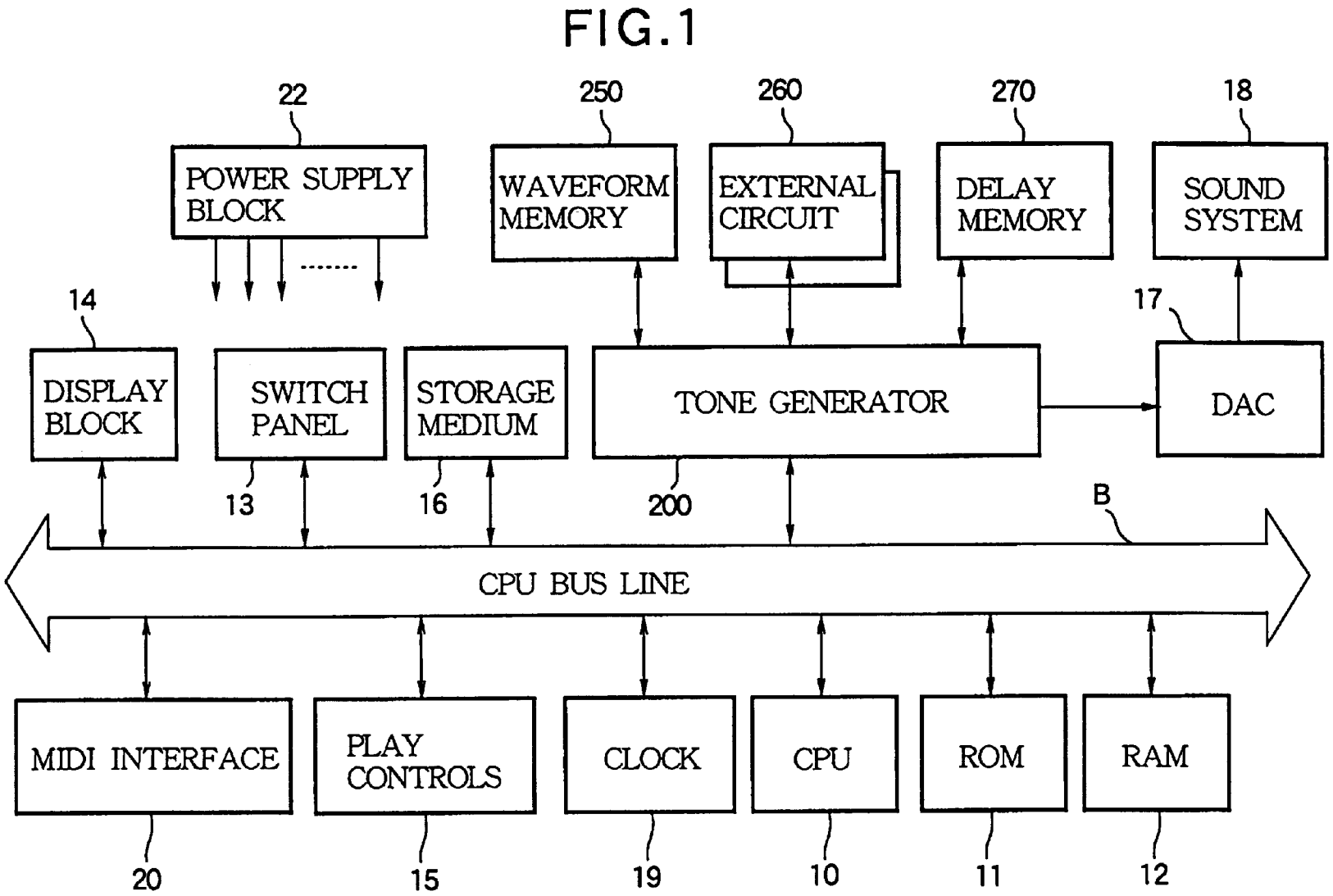
FIG. 1 is a block diagram illustrating an electronic musical instrument practiced as a first embodiment of the invention.

This invention will be described in further detail by way of example with reference to the accompanying drawings. First, a battery-driven electronic musical instrument practiced as a first embodiment of the invention will be described. Referring to FIG. 1, there is shown an overall configuration of this electronic musical instrument. In the figure, references numeral 10 denotes a CPU, which control other components of this electronic musical instrument through a bus (CPU bus line) B. It should be noted that the bus B is a generic bus including control bus, data bus, and address bus. Reference numeral 11 denotes a ROM for storing basic programs and various data for use by the CPU 10. Reference numeral 12 denotes a RAM for temporarily storing various data generated by control operations executed by the CPU 10. Reference numeral 13 denotes a switch panel composed of various manual controls for selecting timbres of tones to be generated and for setting various states. Information specified through the switch panel 13 is supplied to the CPU 10 through the bus B. Reference numeral 14 denotes a display block which is constituted by a CRT or an LCD panel to display, under the control of the CPU 10, the information inputted from the switch panel 13 and currently set information.

Reference numeral 15 denotes play controls, which includes a music keyboard, a pitch-bend wheel, and a pedal for example. Each key of the keyboard is arranged with a key sensor (not shown) for detecting a play operation by a player made on the keyboard. Each key sensor supplies, to the CPU 10 through the bus B, resultant key information such as a key code KC indicative of the pitch of a pressed key, key-on KON indicative of the generation of a tone when a key is pressed, key-off KOFF indicative of the damping of a tone when a key is released, and velocity VEL indicative of a speed at which a key is pressed. Reference numeral 16 denotes a storage medium such as an FDD (Floppy Disk Drive) or an HDD (Hard Disk Drive) for recording various data and programs. Reference numeral 19 denotes a clock circuit for supplying a clock signal to other components of the electronic musical instrument. Reference numeral 20 denotes a MIDI interface for transferring MIDI signals with external MIDI devices. Reference numeral 22 denotes a battery-based power supply block.

Reference numeral 200 denotes a tone generator which provides 64 sounding channels in a time division manner, generates a tone signal in each channel, and performs a predetermined effect algorithm to impart an effect to a generated tone signal. To achieve this purpose, the tone generator 200 incorporates a DSP (Digital Signal Processor) for effect impartment. Reference numeral 250 denotes a waveform memory storing plural pieces of basic waveform data for each timbre. Reference numeral 260 denotes an external circuit, which is a unit for supplying a tone signal, other than the tone generator 200, or a unit such as an externally connected effector. Reference numeral 270 is a delay memory which is used by the built-in DSP. A tone signal generated by the tone generator 200 is converted by a DC converter 17 into an analog signal, which is then externally sounded through a sound system 18 composed of an amplifier, a loudspeaker, and so on.

1.1.2 Tone Signal Line in Tone Generator

Figure 2:
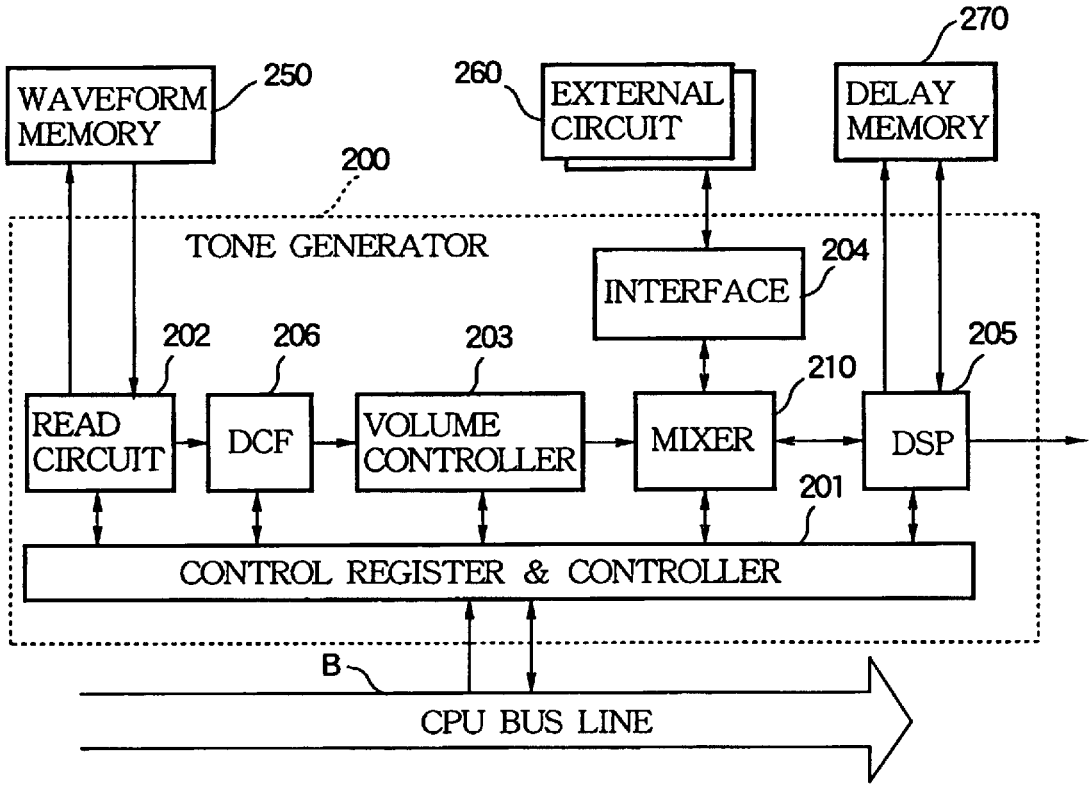
FIG. 2 is a block diagram illustrating a tone signal line of a tone generator of the first embodiment.

The following describes a tone signal line in the tone generator 200 with reference to FIG. 2. In the figure, reference numeral 201 denotes a control register & controller for controlling other components of the tone generator under instruction by the CPU 10 through the bus B. A read circuit 202 reads from the waveform memory 250 the waveform data of a specified timbre by executing address manipulation such that the read waveform data provide a pitch specified by a key code KC. A DCF (Digital Control Filter) 206 executes various filtering operations on the waveform data read by the read circuit 202.

A volume controller 203 controls the amplitude or envelope of the waveform data supplied through the DCF 206 such that the waveform data provide a loudness specified by velocity VEL, thereby providing a tone generator output before effect impartment. The read circuit 202, the DCF 206 and the volume controller 203 can operate in the time-divided 64 channels for generating a different tone signal in each channel. The CPU 10 allocates a note to one of the 64 channels when a sounding command such as key pressing occurs, and writes tone control data for controlling tone generation according to this sounding command to a channel area allocated by the control register & controller 201. On the basis of the written tone control data, the read circuit 202 and the volume controller 203 generate a tone accordingly. It should be noted that, from the volume controller 203, the generated tone from each channel is outputted to a mixer 210 under multiplexing state of 64-channel time division at every sampling frequency.

The mixer 210 executes predetermined processing on the tone signals inputted from the volume controller 203 and an tone signal inputted from the external circuit 260, and outputs a resultant signal to DSP 205 and the external circuit 260. Also, of the outputs to the DSP 205, the mixer 210 returns given output signals of some channels to the read circuit 202 through the line. The read circuit 202 can write the returned signal to the RAM area of the waveform memory as new data. As described, the DSP 205 imparts sound effects to the tone signals. A tone signal for 4 channels, a part of the result of this effect processing, is supplied to the DA converter 17 shown in FIG. 1, thereby providing a final output of this electronic musical instrument. It should be noted that the output of the electronic musical instrument is given in the form of the output of the DSP 205 because the final stage of this electronic musical instrument is an equalizer, one of the effect blocks constructed in the DSP 205.

The following briefly describes a method of computation practiced in the DSP 205. The DSP 205 has a program memory (not shown) for storing microprograms. The present embodiment assumes that the maximum number of steps constituting one microprogram be 1024, the maximum number of input channels of the waveform data to be processed be 16, and the maximum number of output channels of the processed waveform data be also 16. The channels (input and output channels) as used in the DSP 205 are different in concept from the sounding channels as used in the read circuits 202 and the volume controller 203. Namely, a sounding channel is generated and allocated every time a note-on event is supplied from the play controls 15 or the MIDI interface 20. The input channel in the DSP 205 is used for receiving the waveform data which is inputted from the mixer 210 to the DSP 205, for example, a result of mixing these waveform data for each part (each timbre). The output channel outputs to the mixer 210 the waveform data on which processing such as effect impartment has been executed in the DSP 205. A technology for channel switching on a time-division basis is detailed in Japanese Published Unexamined Patent Application No. Hei 11-85155 and corresponding U.S. patent application Ser. No. 09/115,616, for example.

At the starting of every sampling period, the mixing results of the mixer 210 (the waveform data resulted from the mixing processing executed by the mixer 210 in the last sampling period) are sequentially read by the DSP 205 and stored in a register of the DSP 205. The DSP 205 sequentially executes signal processing on the stored waveform data of each input channel as instructed by the microprogram starting with its first step. If, this signal processing requires to delay the waveform data for a relatively long time, the DSP 250 writes the waveform data to be delayed into the delay memory 270, and reads the waveform data previously written in the delay memory 270 during the sampling period corresponding to the delay time, thereby realizing the delay processing. Thus, the DSP 205 executes the signal processing based on the microprogram consisting of the maximum of 1024 steps on the waveform data for the maximum of 16 input channels, thereby outputting the waveform data for the maximum of 16 output channels to the mixer 210. As described, the DSP 205 supplies the computational results for the predetermined 4 channels to the DA converter 17 shown in FIG. 1 as a final tone signal.

Figure 9A:
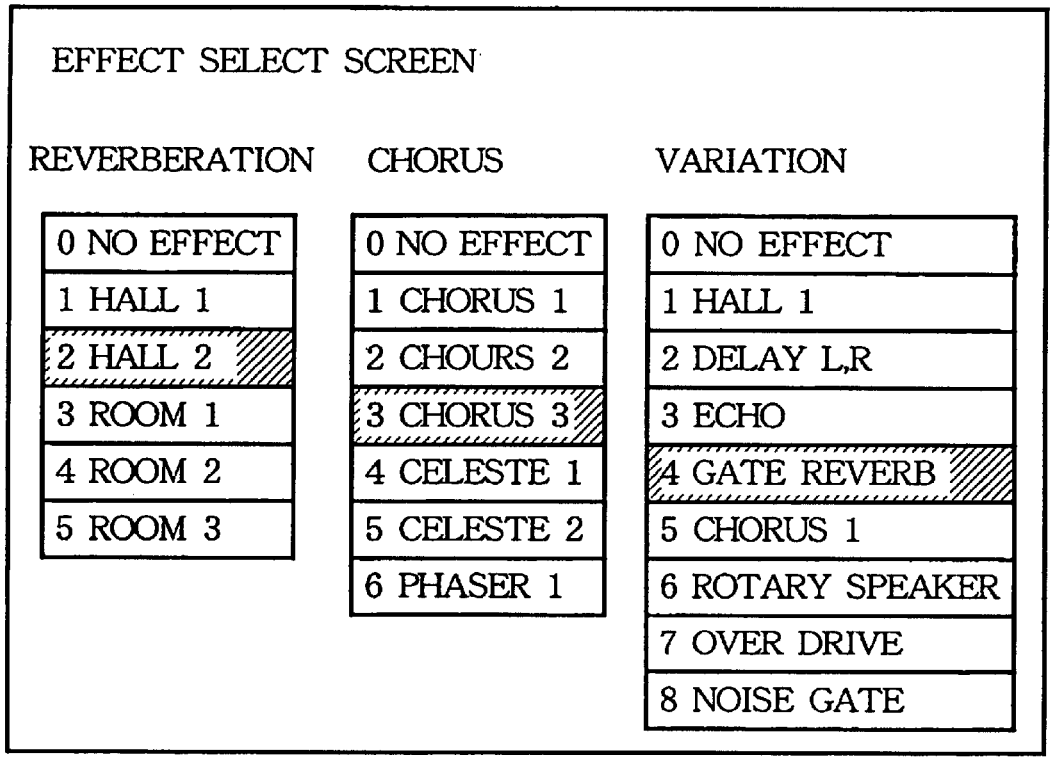
FIGS. 9A and 9B are diagrams illustrating examples of the effect select screen of the first embodiment.

The following briefly describes sound effects treated in the present embodiment. The effects may be classified into three blocks of reverberation, chorus, and variation. In each block, one of the effects as shown in FIG. 9A for example can be selected. Any one signal can be selected from the above-mentioned 16 channels, and supplied to each effect (it is also practicable to allocate two or more channels to one effect). One or more output signals resulted from each effect processing can be set so that they are outputted from any of the above-mentioned 16 output channels and the 4 channels of the DA converter 17 (it is also practicable to supply the output of one effect block to two or more channels). Namely, a signal level to be supplied to each effect can be set for each tone signal of each part. It is also practicable to continuously connect effects with each other. A specific example thereof is disclosed in the above-mentioned patent application.

1.1.3 Clock Signal Line in Tone Generator

Figure 3:
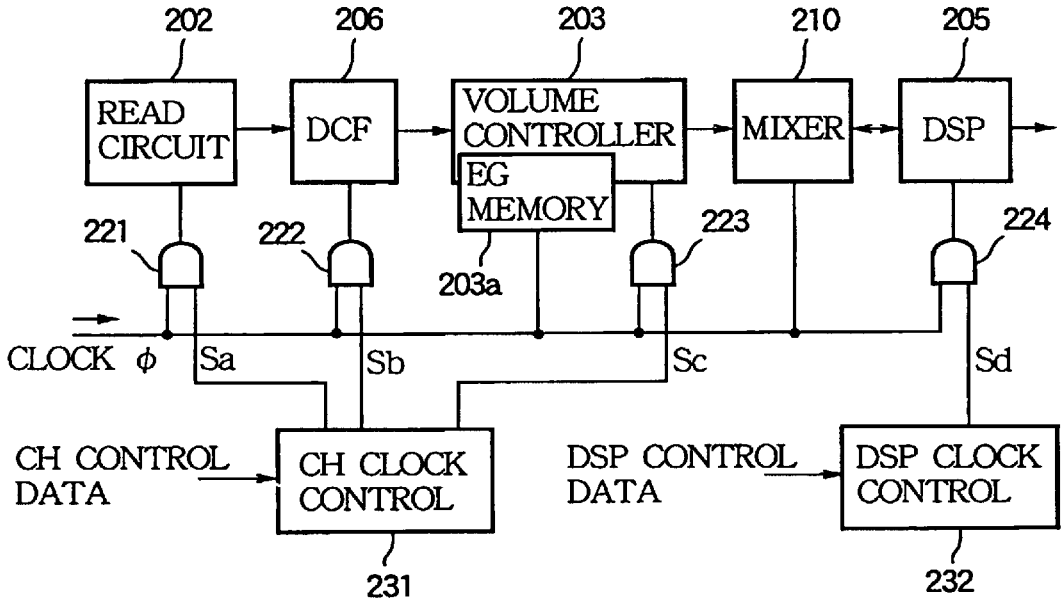
FIG. 3 is a block diagram illustrating a clock signal line of the tone generator of the first embodiment.

The following describes a clock signal line in the tone generator 200 with reference to FIG. 3. In the figure, a clock signal ϕ is supplied to one input terminal of each of AND gates 221 through 224. Mask signals Sa through Sd are supplied to the other input terminals of the AND gates 221 through 224, respectively. Consequently, the clock signal ϕ is supplied to the read circuit 202, the DCF 206, the volume controller 203, and the DSP 205 while the mask signals Sa through Sd are placed at logical "1", respectively (namely, during a supply period). In the remaining periods, the clock signal ϕ is not supplied, so that these components of the tone generator are held in the stopped state.

Figure 4A:
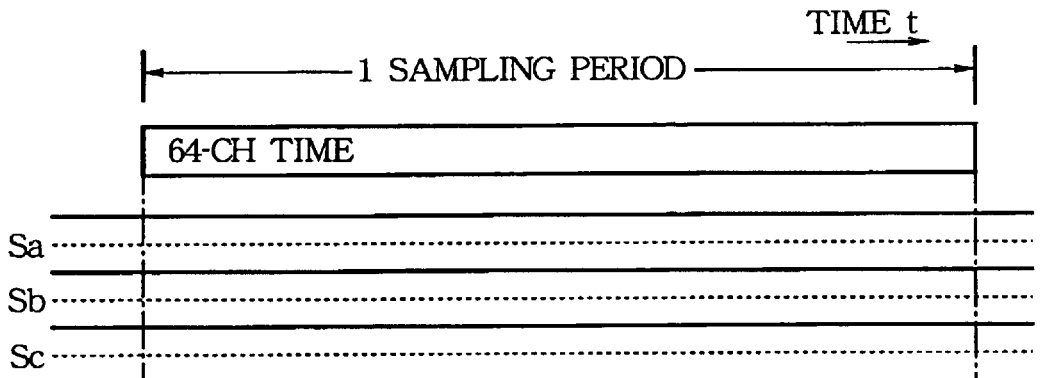
FIGS. 4A, 4B, 4C, 4D, 4E, and 4F are timing charts showing operation of a sounding channel clock controller and a DSP clock controller of the first embodiment.
Figure 4B:
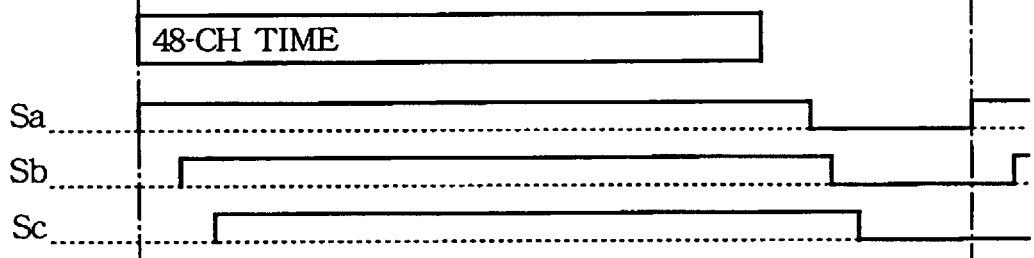
Figure 4C:
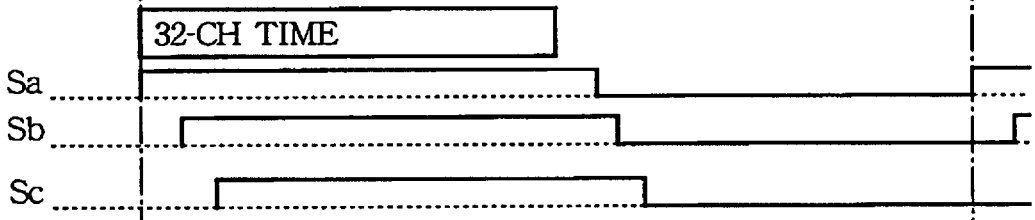

Reference numeral 231 denotes a sounding channel clock controller, which receives channel control data from the CPU 10, and outputs the above-mentioned mask signals Sa through Sc on the basis of the received data. The channel control data denote numeric data 0 through 64 indicative of how many channels are permitted to work among the maximum of 64 channels. In FIGS. 4A through 4C, the waveforms of the mask signals Sa through Sc are illustrated when the channel control data are 64, 48, and 32, respectively.

In FIG. 4A, all sounding channels (64) are valid, so that the mask signals Sa through Sc are always at logical "1". In FIG. 4B, 48 sounding channels are valid, so that the duty ratios of the mask signals Sa through Sc are, respectively, approximately 48/64. It should be noted that these duty ratios are slightly greater than 48/64. This is because the read circuit 202, the DCF 206, and the volume controller 203 execute pipeline processing, in which these duty ratios correspond to a duration of a time between the starting of the first stage of the pipeline processing by a sounding channel to be processed first and the ending of the final stage of the pipeline processing of another sounding channel to be processed last. For example, a duration of time between the starting and ending of the processing of one sounding channel is longer than 1/64 of the sampling frequency.

It should also be noted that the mask signals Sb and Sc are each slightly delayed in phase behind the mask signal Sa. These delays are provided to make the mask signals correspond to the above-mentioned time delay in the pipeline processing. Referring to FIG. 4C, 32 channels are made valid, so that, as with the example shown in FIG. 4B, the duty ratios of the mask signals Sa through Sc are, respectively, slightly greater than 32/64.

Figure 4D:
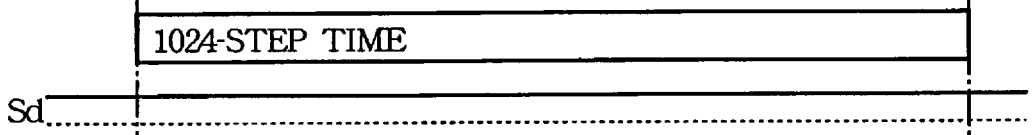
Figure 4E:
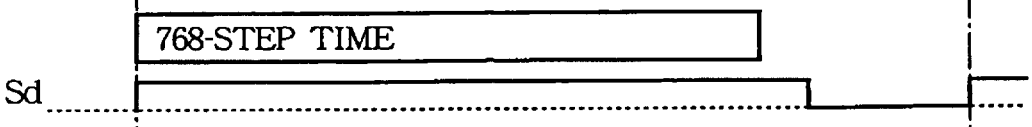
Figure 4F:
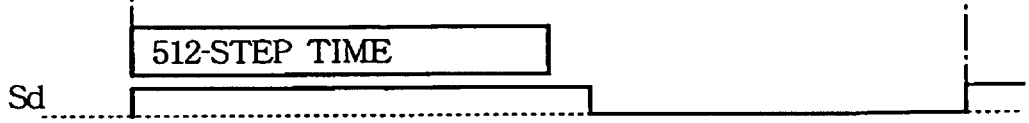

Returning back to FIG. 3, reference numeral 232 denotes a DSP clock controller, which receives DSP control data from the CPU 10, and outputs the above-mentioned mask signal Sd on the basis of the received signal. The DSP control data denote numeric data 0 through 1024 indicative of the number of steps (up to 1024) permitted for the microprogram. FIGS. 4D through 4F show the waveforms of the mask signal Sd when the DSP control data are 1024, 768, and 512, respectively. Referring to FIG. 4D, all sounding steps (1024) are made valid, so that the mask signal is always at logic "1". The duty ratios of the mask signal Sd shown in FIG. 4E and 4F are slightly greater than 768/1024 and 512/1024, respectively, due to the pipeline processing in the DSP 205. These values correspond to a duration of time between the starting of the first stage of the pipeline processing by a step of the microprogram to be executed first and the ending of the final stage of the pipeline processing of another step to be processing last.

According to the invention, as described above, the inventive music apparatus is constructed for processing a music tone signal in response to a clock signal at each sampling period. In the music, a clock generator in the form of the clock circuit 19 generates the clock signal. A signal processor is provided in the form of the tone generator 200 including the read circuit 202, DCF 206, volume controller 203 and DSP 205, and is operable in synchronization to the clock signal ϕ for time-divisionally processing a plurality of music tone signals through a plurality of channels within one sampling period. A clock controller is provided in the form of the channel clock controller 231 and the DSP clock controller 232. The clock controller is operative during a supply duration determined by the mask signals Sa-Sd and allocated within one sampling period for supplying the clock signal to the signal processor from the clock generator to thereby operate the signal processor, and is operative during other than the supply duration within one sampling period for stopping the supplying of the clock signal to the signal processor to thereby suspend the signal processor.

Referring to FIG. 3 again, the volume controller 203 incorporates an EG memory 203a for storing a current volume level of each sounding channel. To this memory, an unmasked clock signal ϕ is supplied. Because the EG memory 203a is referenced by the CPU 10 from time to time as required (for releasing sounding channels, for example), the EG memory 203a is kept in an active state by this clock signal such that the EG memory 203a is always accessible by the CPU 10. The unmasked clock signal ϕ is also supplied to the mixer 210. This is because the mixer 210 executes a time division operation different from the sounding channels and microprogram steps, thereby making it impossible to simply stop this operation of the mixer 210 on the basis of channel control data and DSP control data.

1.2 Operation of First Embodiment 1.2.1 Note-on Event Processing

The following describes operation of the present embodiment. First, when the electronic musical instrument (EMI) is powered on, the EMI is placed in the play mode. When the user presses a key on the play controls 15 or when a note-on signal is supplied through the MIDI interface 20, a note-on event is generated, upon which a program shown in FIG. 7 is executed by the CPU 10.

Figure 7:
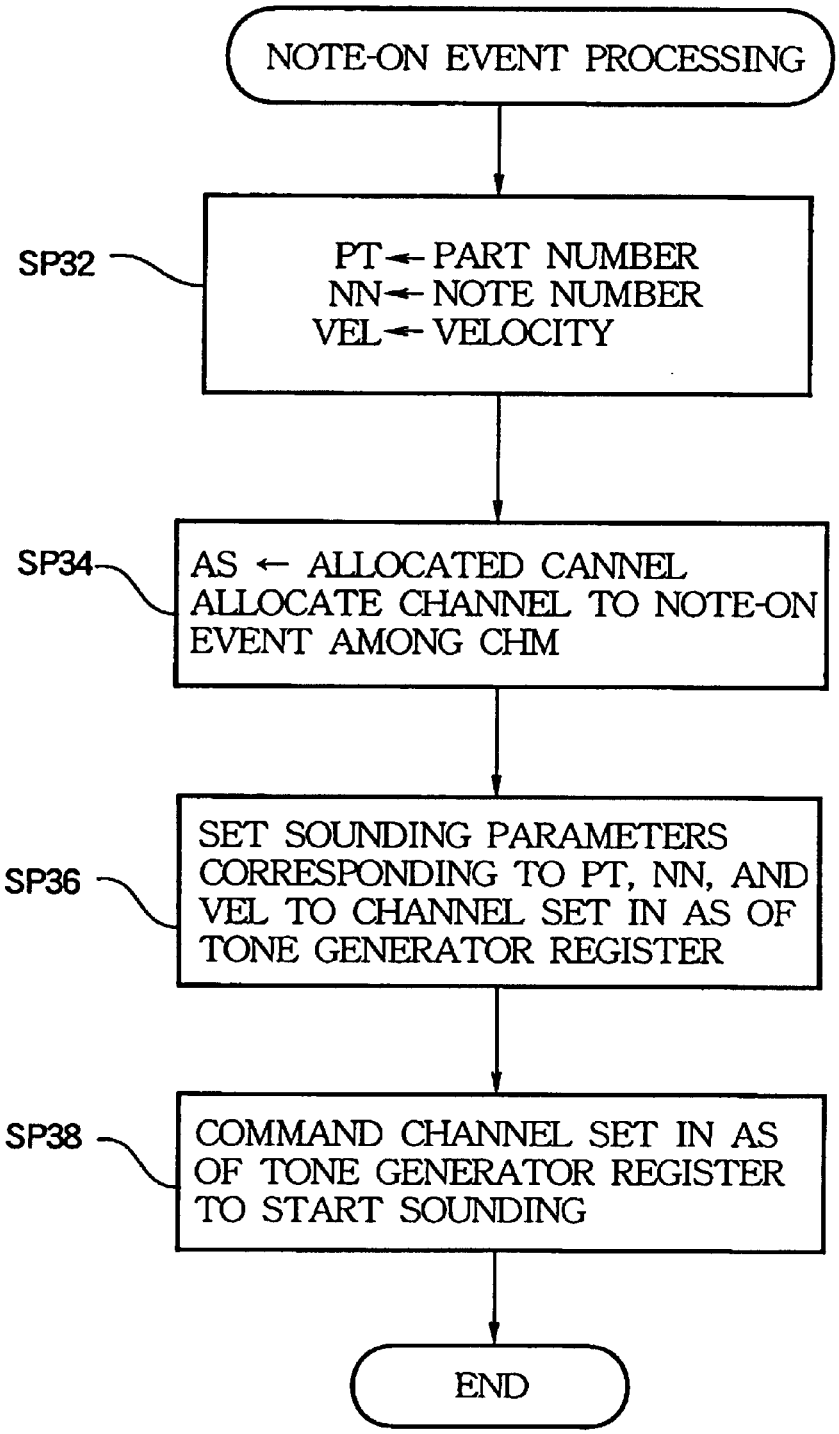
FIG. 7 is a flowchart describing note-on event processing of the first embodiment.

Referring to FIG. 7, when the process goes to step SP32, the part number, note-number, and velocity of the newly generated note-on event are substituted into variables PT, NN, and LEV, respectively. Next, in step SP34, among the channels determined by variable CHM, a channel corresponding to this note-on event is allocated. The number of the allocated sounding channel is substituted into variable AS.

Variable CHM denotes the permitted number of sounding channels. As default, this variable is initialized to the maximum number of channels. CHMax (64) of the present electronic musical instrument. Namely, in step SP 34, if the number of channels currently sounded is smaller than the permitted number of channels CHM, a new channel is allocated to a new note-on event. On the other hand, if the number of channels currently sounded is equal to the permitted number of sounding channels CHM, the CPU 10 references the EG memory 203a and acquires the volume level of each sounding channel. The CPU 10 detects a channel having the lowest volume level and frees or releases this channel. The CPU 10 allocates a new note-on event to the freed channel.

In step SP36, sounding parameters in accordance with the part number PT, note number NN, and velocity VEL are set to a tone generator register (not shown) of the channel number AS in the control register & controller 201. In step SP38, sounding is instructed to start the tone generator register of the channel number AS. Subsequently, in the tone generator 200, a tone waveform is synthesized by the read circuit 202, the DCF 206 and the volume controller 203 for that sounding channel. The synthesized tone waveform is imparted with an effect by the DSP 205 as required, and the resultant tone signal is sent to the sounding system 18 to be sounded.

1.2.2 Displaying of Power Saving Setting Screen

Figure 5:
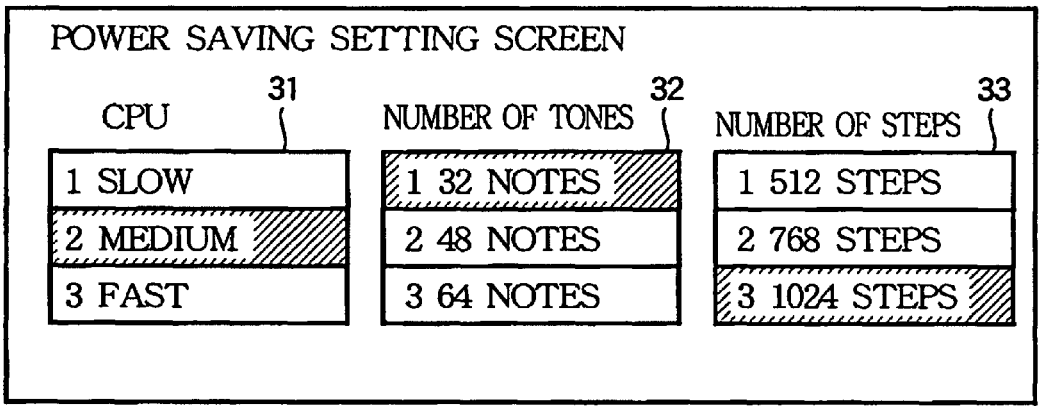
FIG. 5 is a diagram illustration one example a power saving setting screen of the first embodiment.

When the user executes a predetermined operation in the play mode, a power saving setting screen shown in FIG. 5 appears on the display block 14. In FIG. 5, reference numeral 31 denotes a CPU setting section in which three options "SLOW", "MEDIUM", and "FAST" are selectively arranged for the operating clocks of the CPU 10. Reference numeral 32 denotes a block for setting the permitted number of sounding channels in which three options 32, 48 and 64 are arranged. Reference numeral 33 denotes a block for setting the permitted number of steps in which three options 512, 758 and 1024 are arranged as the number of steps permitted for the microprogram of the DSP 205.

(1) Event processing for inputting the permitted number of sounding channels:

Operating the switch panel 13, the user can select an option in each setting block. The following describes, with reference to FIG. 6A, the processing to be executed when the permitted number of channels is changed on the setting block 32 for setting the permitted number of sounding channels.

Figure 6A:
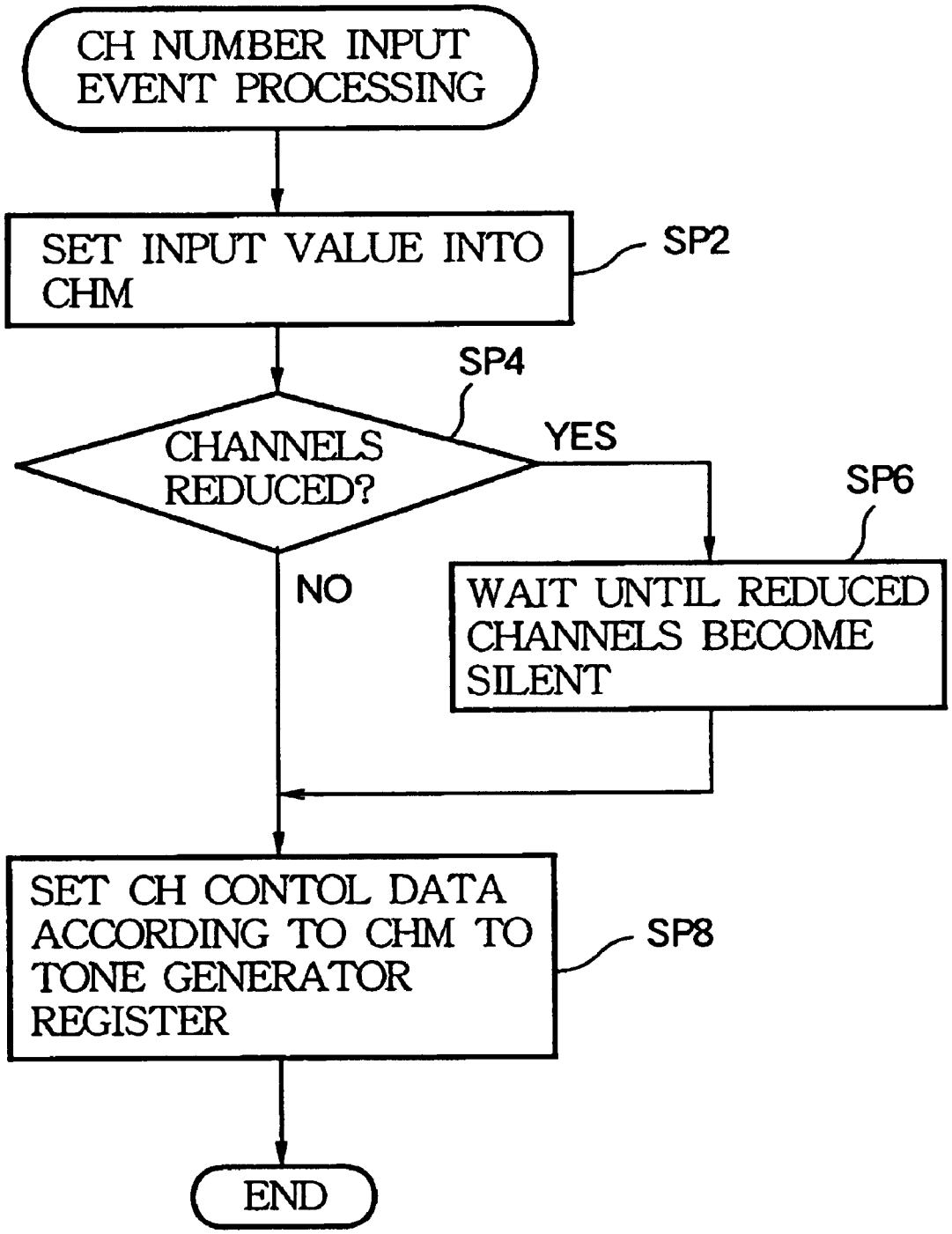
FIGS. 6A and 6B are flowcharts describing event processing in the power saving setting screen of the first embodiment.

Referring to FIG. 6A, in step SP2, the newly inputted permitted number of sounding channels is substituted into variable CHM. Next, in step SP4, this permitted number of sounding channels CHM is compared with the channel control data. If the permitted number of channels CHM is found lower than the channel control data, the decision is NO. Then, in step S8, the permitted number of channels CHM is set to the tone generator register as new channel control data. Consequently, in the sounding channel clock controller 231, the on/off timings of the mask signals Sa through Sc are set on the basis of the new channel control data.

On the other hand, if the decision is YES in step SP4, then the CPU 10 waits until the sounding of all shortfall sounding channels goes off in step SP6. This will be further described by use of the case where the channel control data are 64 and the permitted number of channels CHM has been changed to 48 for example. Because the channel control data are 64, it is likely that sounding channels 49 through 64 are sounding at this point of time. If the channel control data are immediately set to 48, the clock signal ϕ is masked for the channels 49 through 64, so that the volume of that sounding channel immediately becomes zero, thereby generating a shock noise. In order to prevent the shock noise from being generated, the CPU 11 monitors the volume levels of the sounding channels (49 through 64) which may be in sounding state and should be turned off, and the CPU 11 keeps the processing in the standby state until all of the volume levels of the overloaded channels 49-64 go below a predetermined value (as low as zero). Only thereafter, the processing goes to step SP8, so that the channel control data can be reduced without generating a shock noise.

Figure 6B:
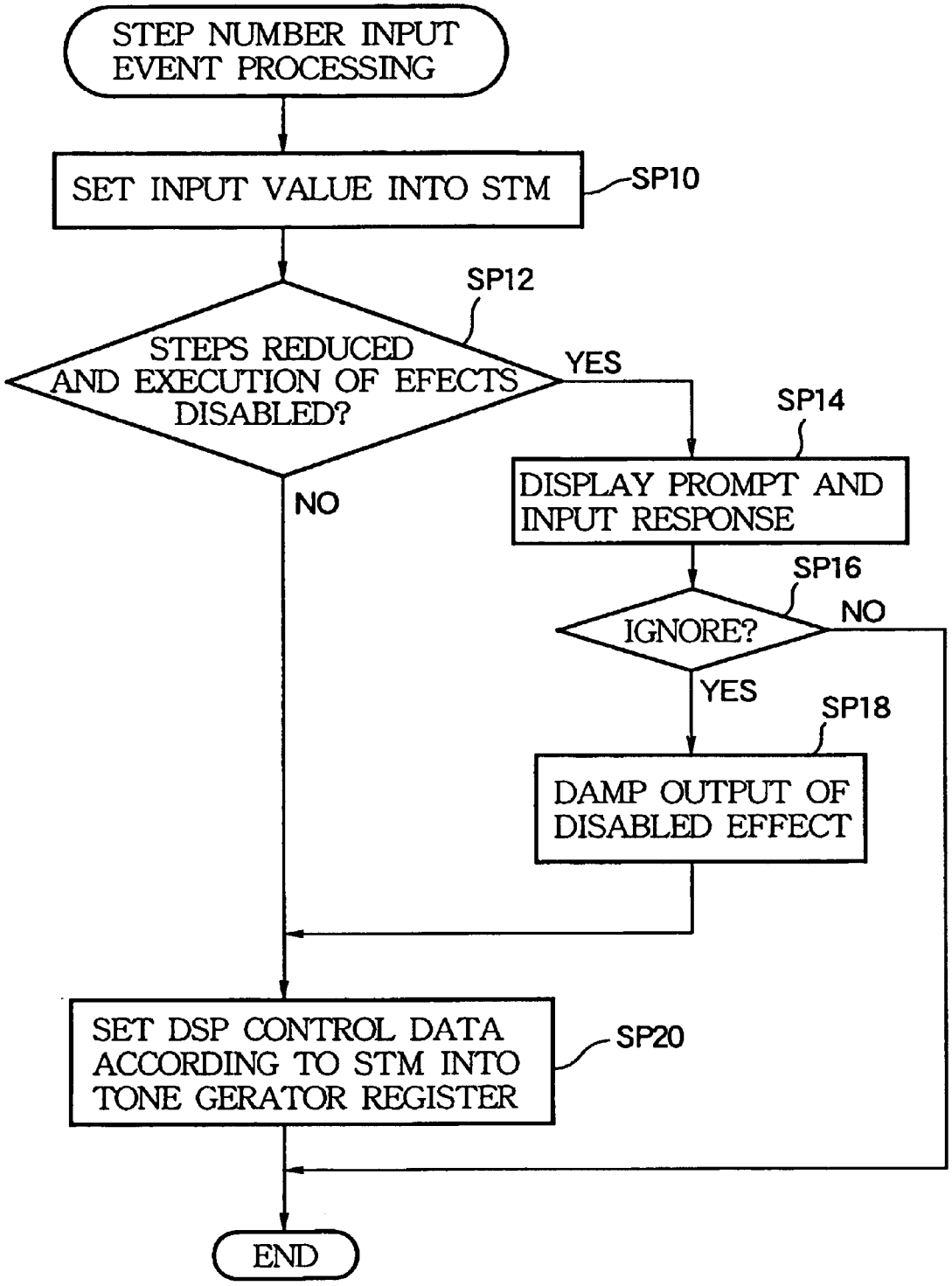

(2) Event processing for inputting the permitted number of steps:

The following describes the processing to be executed when the user changes the permitted number of steps with reference to FIG. 6B. In the figure, the inputted permitted number of steps is substituted into variable STM in step SP10. Next, in step SP12, it is determined whether the number of steps STM has been decreased below the DSP control data and some of the effect processes have become unexecutable. If the decision is NO, then, in step SP20, this permitted number of steps STM is set to the tone generator register in the control register & controller 201 as new DSP control data. Subsequently, the on/off timing of the mask signal Sd is set on the basis of the new DSP control data.

On the other hand, if the decision is YES in step SP12, then the name of an effect to be disabled and an inquiry message whether to forcibly effect through the reduction of the permitted number of steps are displayed on the display block 14 in step SP14. For example, assume that the DSP control data be 1024 and "HALL1" (350 steps) as reverberation. "CHORUS1" (350 steps) as chorus, and "ROTARY SPEAKER" (300 steps) as variation be stored in this order at address 0 through 1000 in the program memory of the microprogram.

If the permitted number of steps STM newly set is 768, the execution of variation "ROTARY SPEAKER" of the above-mentioned effects is disabled. In this case, therefore, a message "Insufficient number of steps; do you want to delete variation ROTARY SPEAKER?" is displayed on the display block 14, and the CPU 10 waits until the user inputs an answer. When the user inputs the answer, then, in step SP16, it is determined whether the answer of the user is for effecting the deletion of the effect. If the decision is NO, the permitted number of steps STM is not reflected as the DSP control data, upon which this routine comes to an end.

On the other hand, if the decision is YES in step SP16, then the output of the effect (ROTARY SPEAKER) to be disabled is damped (namely, gradually reduced to zero) in step SP18 and the microprogram corresponding to the canceled steps is deleted from the program memory of the DSP 205. Subsequently, in step SP20, this permitted number of steps STM is set to the tone generator register as new DSP control data.

1.2.3 Displaying of Effect Select Screen (1) Updating of menu display

Figure 8A:
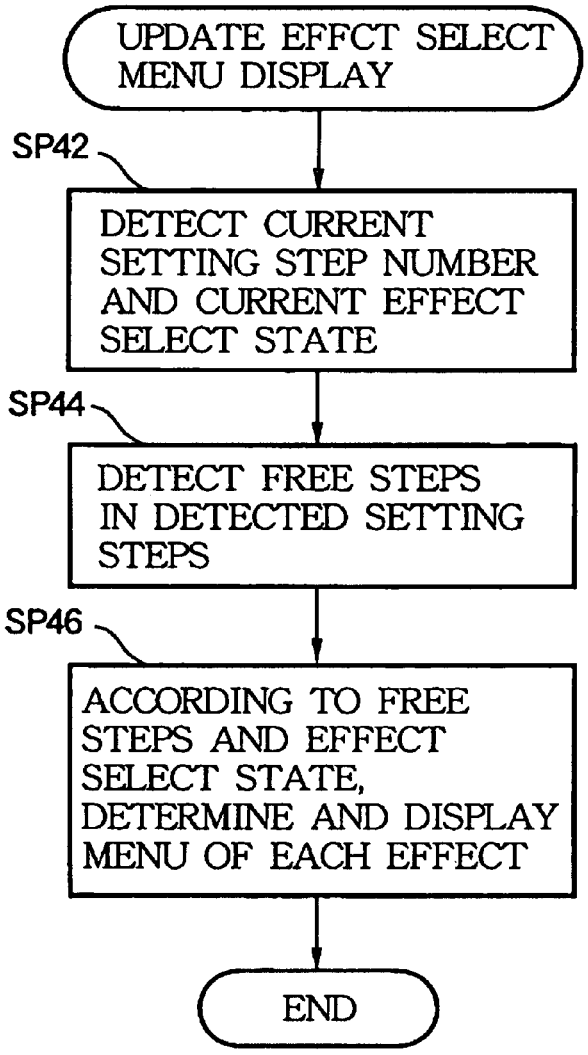
FIGS. 8A and 8B are flowcharts describing event processing in an effect select screen of the first embodiment.

When the user executes a predetermined operation in the play mode, an effect select menu display update routine (FIG. 8A) for specifying and/or changing effects is called. Referring to FIG. 8A, in step SP42, the number of steps set in the current DSP control data and the number of steps actually used in the microprogram are detected. In step SP44, subtraction is executed between these numbers of steps to detect the number of free steps in the number of set steps in the DSP control data.

In step SP46, on the basis of the number of free steps and a state of effect selection, a menu (changeable effect options) of each effect is determined and the determined menu is listed on the display block 14. FIG. 9A shows one example of this display. In the figure, "HALL2" is selected as reverberation, "CHORUS3" as chorus, and "GATE REVERB" as variation (the selections are highlighted in reverse). The effects not selected are also displayed. This indicates that these unselected effects can be selected for the currently selected effect. Namely, even if the select state is changed, the total number of steps of the microprogram will not exceed the DSP control data.

(2) Effect select event processing

Figure 8B:
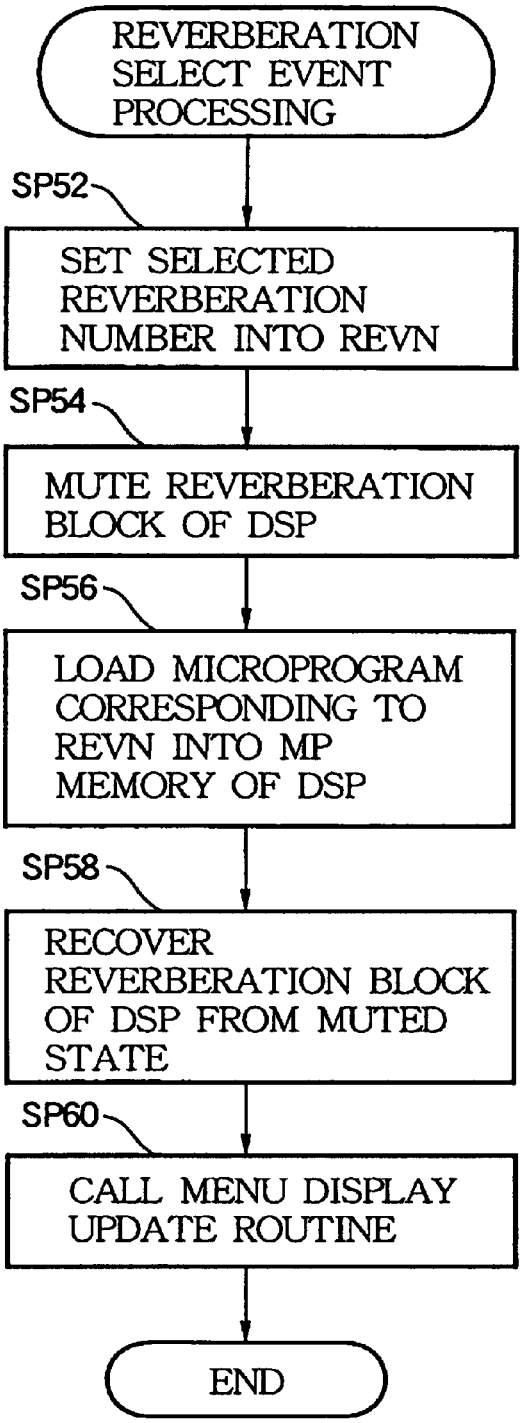

When the user selects an effect in the effect select screen (FIG. 9A), select switching processing is executed accordingly. For one example of this processing, processing executed when a reverberation change is specified will be described with reference to FIG. 8B. In the flowchart, in step SP52, the number of a newly selected reverberation is stored in variable REVN. In step SP54, the reverberation block of the DSP 205 is muted.

In step SP56, a microprogram corresponding to the reverberation number REVN is loaded in the microprogram memory of the DSP 205. In step SP58, the reverberation block of the DSP 205 is recovered from the muted state. In step SP60, the effect select menu display update routine (FIG. 8A) is called again to display an effect select screen with a changed reverberation onto the display block 14. With the chorus and variation effects, the similar processing is executed to update the contents of display on the display block 14. In each block, if "NO EFFECT" is selected, the microprogram of the effects of the selected block is freed in step SP56. To be specific, this block is filled with NOP (No Operation) codes.

Figure 9B:
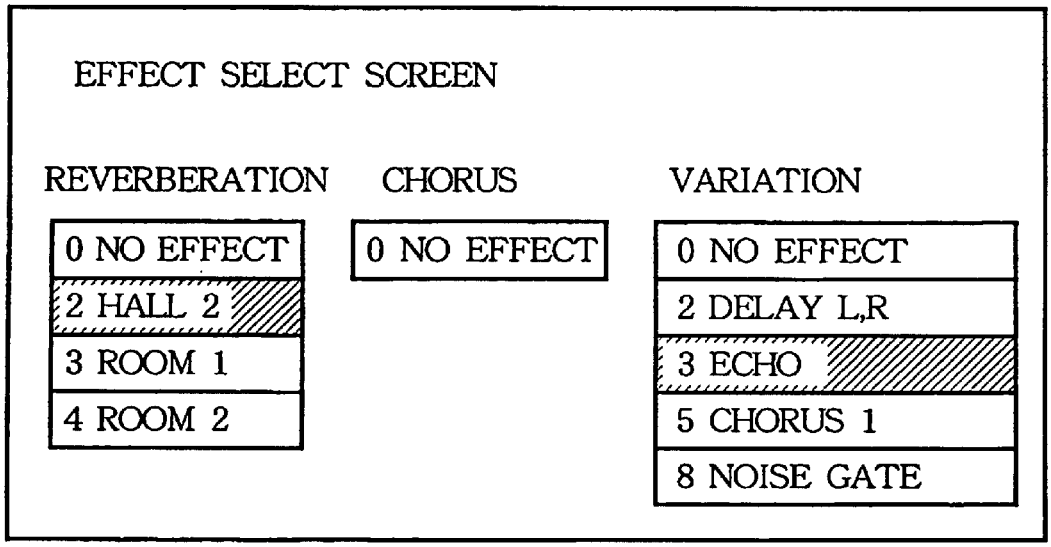

Thus, the user can select or deselect any effect in each effect block within a range permitted by the DSP control data. It should be noted that the effect select screen shown in FIG. 9A assumes that the DSP control data be 1024 (the maximum number of steps). FIG. 9B shows an effect select screen to be displayed when the DSP control data are less than 1024; for example, 512. In the figure, reverberation "HALL2" and variation "ECHO" have been selected already. In the reverberation block and the variation block of the effect select screen, selectable effects (the total number of steps not exceeding 512) are listed in addition to the already selected effects. In this case, however, the number of selectable effects is smaller than those listed in the screen shown in FIG. 9A. This is because only the effects of comparatively small number of steps can be loaded in the microprogram memory.

In the chorus block, only "NO EFFECT" is displayed. This indicates that there is no room for adding any chorus effect, because the reverberation and variation effects have been set already. However, if either reverberation or variation is set to "NO EFFECT" for example, the corresponding microprogram is unloaded and one or more chorus effects which can be loaded in the resultant free steps are displayed in the effect select screen.

As described with reference to the first embodiment, in the inventive apparatus, an allocating device is provided in the form of the switch panel 13. As exemplified by the blocks 31 and 32 shown in FIG. 5, the allocating device allocates a predetermined supply duration within one sampling period. Further, as exemplified by the channel number limiting Step SP34 of FIG. 7 and effect designation limiting step shown in FIGS. 9A and 9B, a specifying device specifies a detail of processing of the music tone signals in accordance with the predetermined supply duration so that the signal processor can complete the processing of the music tone signals within the predetermined supply duration. In such a case, the allocating device allocates the predetermined supply duration based on a predetermined number of channels through which music tones are generated concurrently by the processing of the music tone signals. Otherwise, the allocating device allocates the predetermined supply duration based on a predetermined number of steps by which a program is executed stepwise for processing the music tone signals. Further, the specifying device specifies the detail of the processing of the music tone signals in terms of a number of channels through which the music tone signals are processed for concurrent generation of music tones. Otherwise, the specifying device specifies the detail of the processing of the music tone signals in terms of a kind of a program selectably executed by the signal processor in the processing of the music tone signals.

2. Second Embodiment

The following describes an electronic musical instrument practiced as a second embodiment of the invention. The hardware and software configurations of the second embodiment are generally the same as those of the first embodiment. Therefore, the following describes only the differences from the first embodiment.

2.1 Hardware Configuration of Second Embodiment

Figure 10:
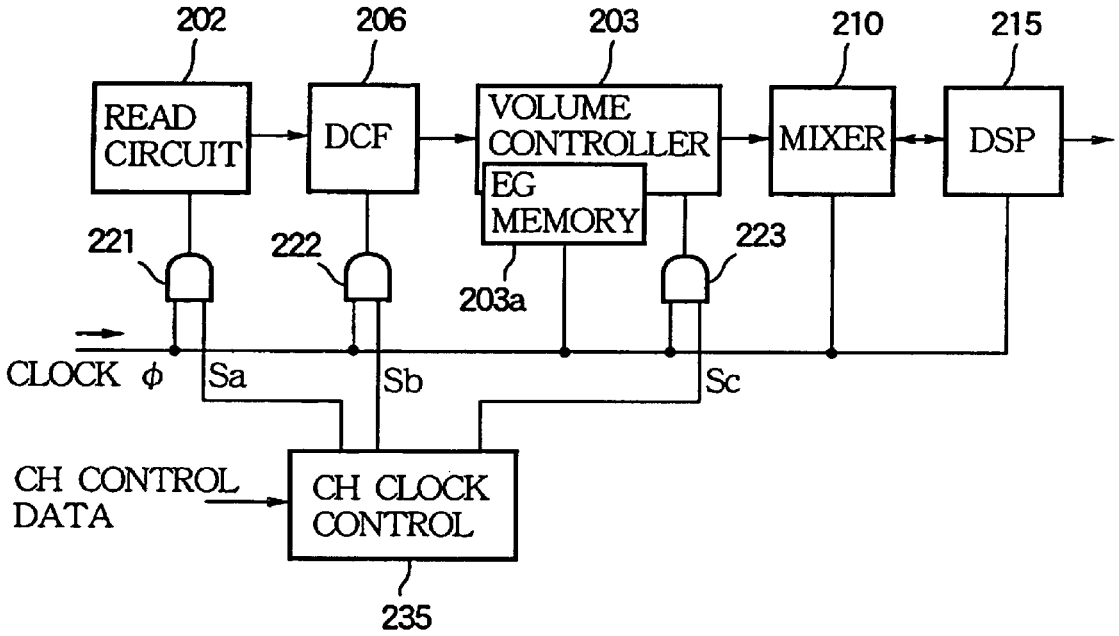
FIG. 10 is a block diagram illustrating a clock signal line of a tone generator of a second embodiment of the invention.

A clock signal line of a tone generator 200 of the second embodiment will be described with reference to FIG. 10.

In the figure, reference numeral 235 denotes a sounding channel clock controller, which is provided in place of the sounding channel clock controller 231 of the first embodiment. In the sounding channel clock controller 235, channel control data are 64 bits long.

These bits correspond to 0 to 64 sounding channels, respectively, logic "1" denoting that sounding of that channel is enabled and logic "0" denoting that sounding of that channel is disabled. Therefore, depending on a bit pattern, periods of supplying the clock signal ϕ in which the mask signals Sa through Sc go logic "1" may be scattered in one sampling period. Reference numeral 215 denotes a self power saving DSP, which is provided in place of the DSP 205 of the first embodiment. To the self power saving DSP 215, the clock signal ϕ is supplied without being masked.

Figure 11:
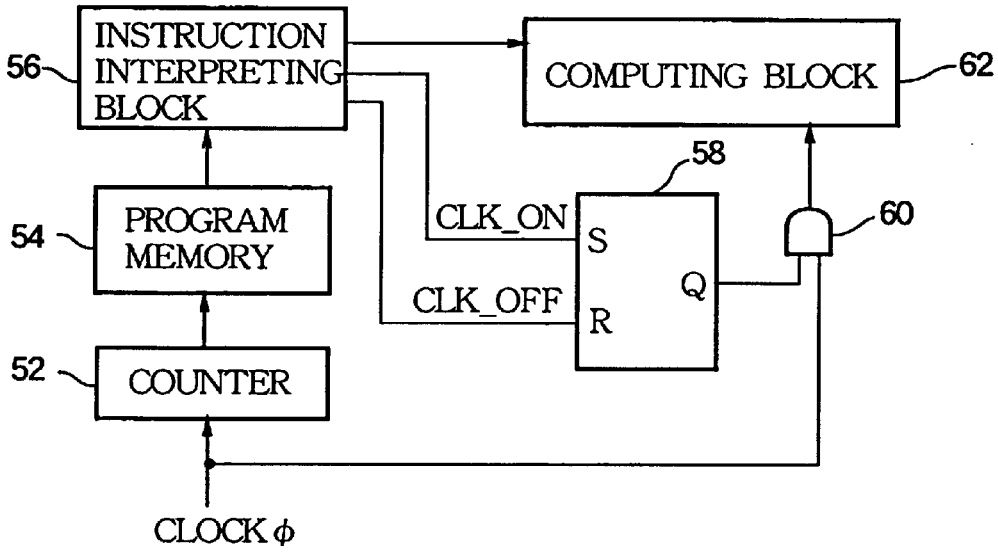
FIG. 11 is a block diagram illustrating a self power saving DSP of the second embodiment.

The following describes a configuration of the self or auto power saving DSP 215 with reference to FIG. 11. In the figure, reference numeral 52 denotes a counter which is reset in every sampling period to count the clock signal ϕ. A count result is supplied to a microprogram memory 54 as a read address. Reference numeral 56 denotes an instruction interpreting block for interpreting an instruction code read from the microprogram memory 54. The block 56 makes a computing block 62 execute various computational operations on the basis of the interpretation. In the second embodiment, special instructions called "clock-on" and "clock-off" are included in an instruction code set.

When the instruction interpreting block 56 detects a clock-on instruction, it sets an RS flip-flop 58. When the instruction interpreting block 56 detects a clock-off instruction, it rests the RS flip-flop 58. Reference numeral 60 denotes an AND gate which executes an AND operation between an output signal Q of the RS flip-flop 58 and the clock signal ϕ, and supplies a result to the computing block 62 as a clock signal. Therefore, once a clock-off instruction is detected by the instruction interpreting block 56, no clock signal is supplied to the computing block 62 until a clock-on instruction is detected next, thereby stopping the operation of the computing block 62, resulting in the reduction of power consumption during that period.

2.2 Operations of Second Embodiment 2.2.1 Note-on Event Processing

Figure 12A:
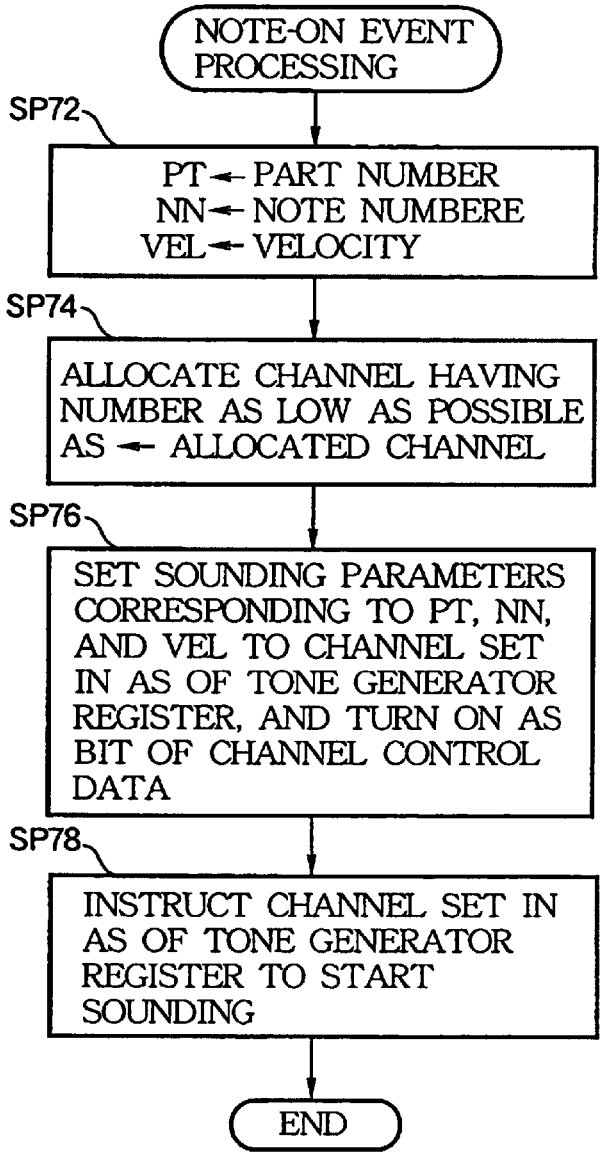
FIGS. 12A, 12B, and 12C are flowcharts describing processing programs of the second embodiment.

In the second embodiment, when a note-on event occurs, a routine shown in FIG. 12A is executed instead of the routine shown in FIG. 7. Referring to FIG. 12A, in step SP72, the part number, note number, and velocity of the newly generated note-on event are substituted into variables PT, NN, and VEL, respectively. In step SP74, one of the 64 channels is allocated to the note-on event.

The following describes the rules of the allocation. If all of the 64 channels are currently sounding (namely all of the 64 channels have a volume level above a predetermined value), the sounding channel having the lowest volume level is freed. The note-on event is allocated to this freed sounding channel. On the other hand, if there are two or more sounding channels having volume levels lower than the predetermined value, the sounding channel having the lowest channel number is allocated. As described, because the read circuit 202, the DCF 206, and volume controller 203 execute pipeline processing, a time from starting the processing of one sounding channel to ending the same is equal to or longer than 1/64 of sampling period. Therefore, the processing of each sounding channel is overlapped with that of another sounding channel on the time axis by allocating the sounding channel having a channel number as low as possible, thereby lowering the duty ratios of the mask signals Sa through Sc, respectively.

In step SP76, as with the first embodiment, the sounding parameters corresponding to part number PT, note number NN, and velocity VEL are set to a tone generator register (not shown) for channel number AS in a control register & controller 201. In doing so, an AS bit of the channel control data is set to logic "1". In step SP78, sounding is instructed to start for the tone generator register of the channel number AS. Subsequently, in the tone generator 200, a tone waveform is synthesized for the sounding channel. The synthesized tone waveform is imparted with an effect as required and the resultant tone signal is sent to a sounding system 18 to be sounded.

2.2.2 Timer Interrupt Processing

Figure 12B:
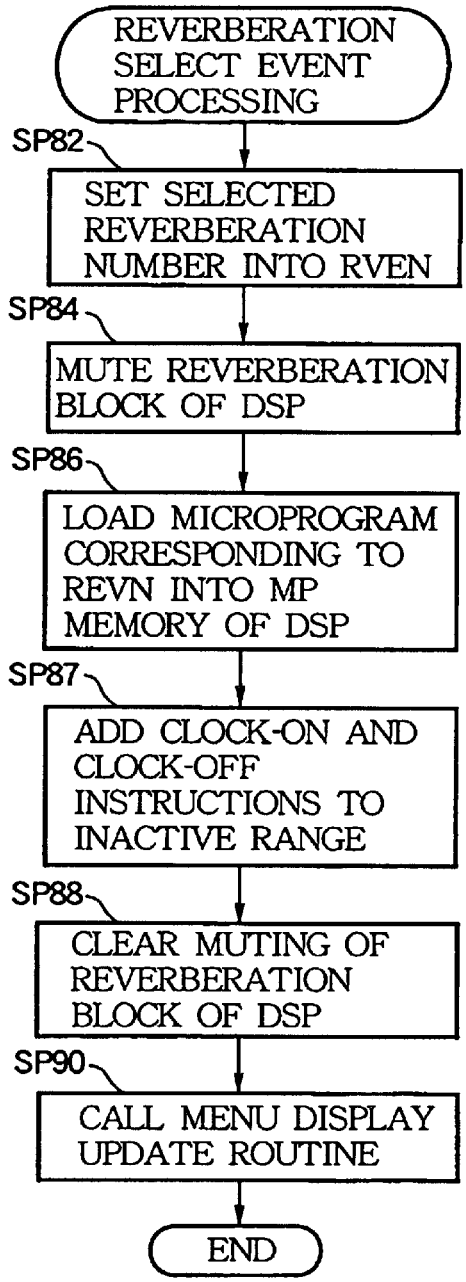
Figure 12C:
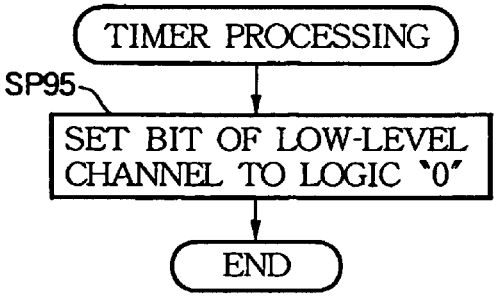

In the second embodiment, a timer interrupt occurs for the CPU 10 at every predetermined time (one second for example), thereby starting the execution of a timer interrupt processing routine shown in FIG. 12C. In the figure, in step SP95, the contents of the EG memory 203a are searched for a sounding channel of which volume level is less than a predetermined value. The bit of the channel control data which corresponds to this channel is set to logic "0".

2.2.3 Displaying of Power Saving Setting Screen

When the user executes a predetermined operation in the play mode, a power saving setting screen is also displayed in the second embodiment. In this embodiment, however, only the CPU setting section 31 is displayed on the display block 14. Hence, there is no processing corresponding to the processing shown in FIGS. 6A and 6B of the first embodiment.

2.2.4 Displaying of Effect Screen (1) Updating of menu display

In the second embodiment also, when the user executes a predetermined operation, the effect select menu display update routine (FIG. 8A) for specifying and/or changing effects is called. In the second embodiment, however, "the maximum number of steps (1024)" is used for "the number of setting steps in current DSP control data" used in the first embodiment. Consequently, the menus of the effects to be displayed on the display block 14 are always as shown in FIG. 9A, and the limited menu display as shown FIG. 9B is not displayed.

(2) Effect select event processing

In the second embodiment also, when the user selects an effect in the effect select screen (FIG. 9A), corresponding select switching processing is executed. The following describes this processing by use of an example in which the user specifies a change of reverberation effects, with reference to FIG. 12B. In the figure, the processing of steps SP82 through SP86, the processing of SP88, and the processing of SP90 are generally the same as those of steps SP52 through SP56, the processing of step SP58, and the processing of SP60.

In the second embodiment, however, processing of step SP87 is provided unlike the first embodiment. In step SP87, a microprogram loaded or unloaded in step SP86 is checked for detecting an inactive range (for example, a range filled with NOP codes) which is equal to or greater than the predetermined number of steps. If this inactive range is detected, a clock-off instruction is added to a location several steps after the first NOP code. These several steps are provided, because it is necessary to wait for the complete end of the pipeline processing of an instruction immediately before the first NOP code. Further, for the same reason, a clock-on signal is added to a location several steps before the end of the inactive range in step SP87. Therefore, when this microprogram is executed, the operation of the computing block 62 stops in the interval between the clock-off code and the clock-on code, thereby reducing the power consumption. This holds true with the change and/or freeing of chorus and variation effects.

As described with reference to the second embodiment, in the inventive apparatus, a specifying device specifies a detail of processing of the music tone signals, as exemplified by effect selecting screen of FIG. 9A and channel allocation step SP74 of FIG. 12A. Further, an allocating device allocates a supply duration within one sampling period in accordance with the specified detail of the processing so that the signal processor can complete the specified detail of the processing of the music tone signals within the allocated supply duration. Such an operation is exemplified by step SP76 of FIG. 12A and SP87 of FIG. 12B.

Thus, according to the second embodiment, the supply of the clock signal $\phi$ can be automatically stopped according to the occasional states of sounding channels and the effects without limiting the number of sounding channels and the selectable effects at all, thereby achieving power saving. This makes it unnecessary for the user to be aware of the power consumption of the electronic musical instrument and therefore the user can concentrate only on music-related jobs.

3. Modifications

The preferred invention is not limited to the above-mentioned embodiments. For example, the following various modifications may be made.

(1) The effect select screen of the first embodiment lists only the selectable effects according to occasional situations as shown in FIGS. 9A and 9B. It will be apparent to those skilled in the art that all effects are listed and the unselectable effects are displayed in an adequate manner (for example, in an inconspicuous manner) to prevent them from being selected.

(2) In the effect select screen of the first embodiment, the number of effect blocks to be displayed may be changed according to the permitted number of steps. For example, if the permitted number of steps is 1024, all blocks are displayed; if it is 768, two blocks are displayed; and, if it is 512, only one block is displayed. The block to be displayed when the permitted number of steps is less than 1024 may be a system default block or one or two user-selected blocks.

(3) In the second embodiment, the values of the channel control data bits are switched by the CPU 10. It will be apparent to those skilled in the art that this processing may be executed inside the tone generator 200 by arranging a channel monitor circuit therein. To be more specific, the channel monitor circuit sequentially reads the volume levels of the sounding channels from the EG memory 203a to determine whether each volume level is equal to or greater than a predetermined level (as low as zero). For the sounding channels with their volume levels found equal to or greater than the predetermined level, the corresponding channel control bit may be set to logic "1". For the other sounding channels, the corresponding channel control bit may be set to logic "0".

However, it is desirable to exclude from the above-mentioned decision, exceptional sounding channels of which volume levels are temporarily low due to the operation of a volume control such as a volume pedal. Therefore, it is preferable to store, for all channels, 64-word exclusion data in the channel monitor circuit, the data being indicative of whether to exclude the channel from the decision. To be more specific, any sounding channel of which exclusion data are logic "1" is excluded from the decision and therefore the corresponding channel control data bit does not go logic "0". On the other hand, for any sounding channel of which exclusion data are logic "0", the corresponding channel control data bit is set according to the volume level of that sounding channel.

In addition, when such control operations may be executed in reading the waveform data of the attack section and loop section from the waveform memory, a channel is excluded from the decision until the attack section has been read (for example, if the exclusion data=2). Otherwise, after a sounding channel is noted on, the sounding channel is excluded from the decision until it is noted off (for example, if the exclusion data=3).

(4) In the second embodiment, the CPU 10 detects the range filled with NOP codes in the microprogram (namely the range not effectively used for the effect processing), and accordingly adds the clock-on and clock-off instructions to the microprogram. Alternatively, the clock-on and clock-off instructions may be automatically executed in the tone generator 200. For example, referring to FIG. 11, the instruction interpreting block 56 may be configured so that, upon detection that the predetermined number of NOP codes are continuously lined, the instruction interpreting block 56 resets the RS flip-flop 58; subsequently, upon detection, by executing instruction look ahead, of an instruction other than NOP at a location several steps later, the instruction interpreting block 56 sets the RS flip-flop 58.

(5) Many recent electronic musical instrument DSPs are each configured as a multi-DSP which executes two or more effect processing operations in parallel (as disclosed in Japanese Published Unexamined Patent Application No. Hei 10-198560 and corresponding U.S. Pat. No. 6,085,309, for example). In this case, it is preferable that control data be set for controlling the supply of an operating clock for each of two or more microprograms executed in parallel. To be more specific, in an operation at every DSP sampling, the operating clock is supplied during a period in which a microprogram for which the control data are set to "supply" and the operating clock is not supplied during a period in which the control data are set to "not supply".

(6) In each of the above-mentioned embodiments, if "NO EFFECT" is selected in any effect block, the microprogram for the effects in that effect block is filled with NOP codes. Alternatively, instead of filling with NOP codes, a microcode for that portion may be configured so that it does not affect other microcodes in execution, for example. Alternatively still, data generated by the microcode for that portion may be prevented from being finally outputted as a tone signal. These two alternatives can be easily implemented by disabling a write operation to the internal registers of the DSP 205 and the delay memory 270 for that portion of the microcode.

4. Species

The present invention is embodied in the following manners.

(1) A tone generating apparatus operating on the basis of an operating clock, comprises a tone generating block for generating tone signals for plural sounding channels in a time division manner, a control data inputting block for inputting control data for controlling the number of above-mentioned plural sounding channels, a clock control block for controlling, on the basis of the above-mentioned control data, the supply of the operating clock to the tone generating block, and a sounding control block for allocating, in accordance with a sounding start instruction, sounding of a tone signal corresponding to this sounding start instruction to all or some of the above-mentioned sounding channels to be determined on the basis of the above-mentioned control data and starting the generation of the above-mentioned tone signal in the allocated sounding channels.

According to the above-mentioned novel constitution, the power to the tone generator for generating tone signals for plural sounding channels in a time division manner can be saved only by adding a simple configuration to a related-art tone generator.

(2) A signal processing apparatus for executing operations of plural steps for every sampling period on the basis of an operating clock, comprises a signal processing block for executing signal processing, a control data input block for inputting the number of steps of a processing operation to be executed by the signal processing block, a clock control block for controlling, on the basis of the above-mentioned control data, the supply of the operating block to the signal processing block, and a processing program selecting block for selecting a program to be executed by the signal processing block in a range of the number of steps determined in accordance with the control data and for setting the selected program to the signal processing block.

According to the above-mentioned novel constitution, the power to the signal processor for executing operations of plural steps in every sampling period can be saved only by adding a simple configuration to a related-art signal processor.

(3) A tone generating apparatus operating on the basis of an operating clock, comprises a tone generating block for generating tone signals for plural sounding channels in a time division manner, a sounding control block for allocating, in accordance with a sounding start instruction, the sounding of a tone signal corresponding to this sounding start instruction to any of the above-mentioned plural sounding channels and starting the generation of this tone signal in the allocated sounding channel, a volume detecting block for detecting a volume level of each of the above-mentioned plural sounding channels, a control data generating block for generating, on the basis of the detected volume level of each sounding channel, control data for controlling the supply of the operating clock for each sounding channel, and a clock control block for controlling, on the basis of the above-mentioned control data, the supply of the operating clock to the above-mentioned tone generating block.

According to the above-mentioned novel constitution, the supply of the operating clock to the tone generator on the basis of the volume level of each sounding channel, thereby maximizing the power saving of the tone generator.

(4) A signal processing apparatus for executing operations of plural steps in every sampling period on the basis of an operating clock, comprises a signal processing block for executing signal processing, a processing program selecting block for selecting a program to be executed by the above-mentioned signal processing block and setting the selected program to the signal processing block, a control data generating block for generating, on the basis of the set program, control data indicative of a program range not valid or effective in this program, and a clock control block for preventing, on the basis of the above-mentioned control data, a part of the clocks from being supplied to the signal processing block.

According to the above-mentioned novel constitution, the operating clock is supplied only for a period in which a valid program is being executed, thereby maximizing the power saving of the signal processor. The valid program herein denotes a program in which a result of signal processing (for example, effect processing) executed by that program has been converted into a perceivable tone.

As described and according to the invention, the supply of a clock signal to a processing circuit can be controlled in synchronization with a sampling period, thereby reducing the power consumption of the processing circuit in accordance with processing load by a simple configuration.

While the preferred embodiment of the present invention have been described using specific terms, such description is for illustrative purposes only, and it is to be understood that changes and variations may be made without departing from the spirit or scope of the appended claims.

What is claimed is:

1. An apparatus for processing a music tone signal in response to a clock signal at each sampling period, the apparatus comprising:

a clock generator that generates the clock signal;

a signal processor operable in synchronization to the clock signal for time-divisionally processing a plurality of music tone signals through a plurality of *tone generating* channels within one sampling period; and a clock controller being operative during a supply duration allocated within one sampling period for supplying the clock signal to the signal processor from the clock generator to thereby operate the signal processor, and being operative during other than the supply duration within one sampling period for stopping the supplying of the clock signal to the signal processor to thereby suspend the signal processor,

*wherein the supply duration is allocated to correspond with one or more of tone generating channels which are allowed to generate music tones.*

2. The apparatus according to claim 1, further comprising an allocating device that allocates [a predetermined] *the* supply duration within one sampling period, and a [specifying] *setting* device that [specifies a detail of processing of the music tone signals in accordance with the predetermined supply duration so that the signal processor can complete the processing of the music tone signals within the predetermined supply duration] *operates based on music data which commands generating of music tones, and that sets one or more of tone generating processes based on the music data to one or more of the plurality of the tone generating channels which time-divisionally process the music tone signals within the allocated supply duration.*

3. The apparatus according to claim 2, wherein the allocating device allocates the [predetermined] supply duration based on a [predetermined] number of *tone generating* channels through which music tones are generated concurrently by the processing of the music tone signals.

[4. The apparatus according to claim 2, wherein the allocating device allocates the predetermined supply duration based on a predetermined number of steps by which a program is executed stepwise for processing the music tone signals.]

5. The apparatus according to claim 2, wherein the [specifying] *setting* device [specifies the detail of the processing of the music tone signals in terms of a number of] *selects one tone generating channel from the tone generating* channels [through which the music tone signals are processed for concurrent generation of music tones] *through*

*which the signal processor can generate music tones by the clock signal supplied in the supply duration among the plurality of the tone generating channels, and sets the tone generating process to the selected tone generating channel.*

[6. The apparatus according to claim 2, wherein the specifying device specifies the detail of the processing of the music tone signals in terms of a kind of a program selectably executed by the signal processor in the processing of the music tone signals.]

7. The apparatus according to claim 1, further comprising a [specifying] *setting* device that [specifies a detail of processing of the music tone signals,] *operates based on music data which commands generating of music tones, and that sets one or more of tone generating processes based on the music data to one or more of the plurality of the tone generating channels,* and an allocating device that allocates [a supply] *the supply* duration within one sampling period in accordance with the [specified detail of the processing so that the signal processor can complete the specified detail of the processing of the music tone signals within the allocated supply duration] *tone generating process set by the setting device.*

8. The apparatus according to claim 7, wherein [the allocating device allocates the supply duration in accordance with the specified detail of the processing in terms of a predetermined number of channels through which music tones are generated concurrently by the processing of the music tone signals] *the setting device selects one tone generating channel from the plurality of the tone generating channels, and sets the tone generating process to the selected tone generating channel.*

[9. The apparatus according to claim 7, wherein the allocating device allocates the supply duration in accordance with the specified detail of the processing in terms of a predetermined number of steps by which a program is executed stepwise for processing the music tone signals.]

[10. The apparatus according to claim 7, wherein the specifying device specifies the detail of the processing of the music tone signals in terms of a number of channels through which the music tone signals are processed for concurrent generation of music tones.]

[11. The apparatus according to claim 7, wherein the specifying device specifies the detail of the processing of the music tone signals in terms of a kind of a program selectably executed by the signal processor in the processing of the music tone signals.]

12. The apparatus according to claim 1, wherein the signal processor processes the music tone signal in such a manner that waveform data of a designated timbre is read out to generate the music tone signal at a designated pitch.

13. The apparatus according to claim 1, wherein the signal processor processes the music tone signal in such a manner that waveform data is read out to generate the music tone signal and the generated music tone signal is subjected to filter processing.

14. The apparatus according to claim 1, wherein the signal processor processes the music tone signal in such a manner as to control an amplitude of the music tone signal.

15. The apparatus according to claim 1, wherein the signal processor processes the music tone signal in such a manner as to impart an effect to the music tone signal.

16. A method of processing a music tone signal in response to a clock signal at each sampling period, the method comprising the steps of:

continuously generating the clock signal;

operating a signal processor in synchronization to the clock signal for time-divisionally processing a plurality of music tone signals through a plurality of *tone generating* channels within one sampling period;

supplying the generated clock signal to the signal processor so as a to operate the signal processor during a supply duration allocated within one sampling period; and stopping the supplying of the generated clock signal to the signal processor so as to suspend the signal processor during other than the supply duration within one sampling period,

*wherein the supply duration is allocated to correspond with one or more of tone generating channels which are allowed to generate music tones.*

17. A medium for use in a music apparatus having a signal processor for processing a music tone signal in response to a clock signal at each sampling period, the medium containing program instructions executable by the music apparatus to perform a method comprising the steps of:

continuously generating the clock signal;

operating the signal processor in synchronization to the clock signal for time-divisionally processing a plurality of music tone signals through a plurality of *tone generating* channels within one sampling period;

supplying the generated clock signal to the signal processor so as a to operate the signal processor during a supply duration allocated within one sampling period; and stopping the supplying of the generated clock signal to the signal processor so as to suspend the signal processor during other than the supply duration within one sampling period,

*wherein the supply duration is allocated to correspond with one or more of tone generating channels which are allowed to generate music tones.*

*18. The apparatus according to claim 1 further comprising a setting device that operates based on music data which commands generating of music tones, and that sets one or more of tone generating processes based on the music data to one or more of the plurality of the tone generating channels, wherein in case that a tone generating process is set to a tone generating channel, the clock controller starts supplying of the clock signal for a period necessary for the tone generating channel to generate music tones so that the tone generating channel of the clock signal for the period when the volume level of the music tones generated by the tone generating channel becomes less than a predetermined value.*

*19. The method according to claim 16 further comprising the step of setting one or more of tone generating processes to one or more of the tone generating channels based on music data which commands generating of music tones, wherein in case that a tone generating process is set to a tone generating channel, the supplying step starts supplying of the clock signal for a period necessary for the tone generating channel to generate music tones so that the tone generating channel starts the generating of the music tone, and the stopping step stops supplying of the clock signal for the period when the volume level of the music tones generated by the tone generating channel becomes less than a predetermined value.*

*20. The medium according to claim 17, wherein the method further comprises the step of setting one or more of tone generating processes to one or more of the tone generating channels based on music data which commands generating of music tones, wherein in case that a tone*

*generating process is set to a tone generating channel, the supplying step starts supplying of the clock signal for a period necessary for the tone generating channel to generate music tones so that the tone generating channel starts the generating of the music tone, and the stopping step stops supplying of the clock signal for the period when the volume level of the music tones generated by the tone generating channel becomes less than a predetermined value.*

* * * * *